(12) United States Patent
Craner

(10) Patent No.: US 11,956,514 B2
(45) Date of Patent: *Apr. 9, 2024

(54) SYSTEMS AND METHODS FOR ENHANCED TRICK-PLAY FUNCTIONS

(71) Applicant: Rovi Guides, Inc., San Jose, CA (US)

(72) Inventor: Michael L. Craner, Chester Springs, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,842

(22) Filed: Jul. 28, 2021

(65) Prior Publication Data

US 2021/0360331 A1 Nov. 18, 2021

Related U.S. Application Data

(63) Continuation of application No. 15/999,696, filed on Aug. 20, 2018, now Pat. No. 11,109,113, which is a
(Continued)

(51) Int. Cl.
*H04N 21/6587* (2011.01)
*H04N 7/173* (2011.01)
(Continued)

(52) U.S. Cl.
CPC ..... *H04N 21/6587* (2013.01); *H04N 7/17309* (2013.01); *H04N 21/2387* (2013.01); *H04N 21/26616* (2013.01); *H04N 21/4312* (2013.01); *H04N 21/4316* (2013.01); *H04N 21/4331* (2013.01); *H04N 21/44004* (2013.01);
(Continued)

(58) Field of Classification Search
CPC ........... H04N 21/6587; H04N 7/17309; H04N 21/2387; H04N 21/26616; H04N 21/4312; H04N 21/4316; H04N 21/4331; H04N 21/44004; H04N 21/47202; H04N 21/47208; H04N 21/47217; H04N 21/812; H04N 21/4334; H04N 21/47205
See application file for complete search history.

(56) References Cited

U.S. PATENT DOCUMENTS

2002/0075572 A1 6/2002 Boreczky et al.
2002/0112004 A1* 8/2002 Reid ................... H04L 65/1101
715/753

(Continued)

*Primary Examiner* — Oschta I Montoya
(74) *Attorney, Agent, or Firm* — Haley Guiliano LLP

(57) ABSTRACT

Systems and methods for rewinding a video to a point before the video was first viewed. Video transmitted by a media source is cached by a remote server. Upon a trick-play request for the video, the server generates a rewind stream that includes the video that was transmitted by the media source before the user started to view the video. Upon receiving the rewind stream, the user's equipment may cache the rewind stream in a rewind buffer and rewind or play from the rewind buffer. The server may also generate and transmit a forward stream of the video that the media source has not yet transmitted. The user's equipment may cache the forward stream in a forward buffer. To perform trick-play operations with the video, the user's equipment may migrate the playback of the video to the rewind and forward buffers and rewind or fast-forward the video from the buffers.

18 Claims, 9 Drawing Sheets

Related U.S. Application Data continuation of application No. 15/049,849, filed on Feb. 22, 2016, now Pat. No. 10,057,655, which is a continuation of application No. 14/470,877, filed on Aug. 27, 2014, now Pat. No. 9,271,042, which is a continuation of application No. 13/102,763, filed on May 6, 2011, now Pat. No. 9,088,827, which is a continuation of application No. 11/365,787, filed on Feb. 28, 2006, now Pat. No. 7,962,942.

(51) Int. Cl.
  *H04N 21/2387* (2011.01)
  *H04N 21/266* (2011.01)
  *H04N 21/431* (2011.01)
  *H04N 21/433* (2011.01)
  *H04N 21/44* (2011.01)
  *H04N 21/472* (2011.01)
  *H04N 21/81* (2011.01)

(52) U.S. Cl.
  CPC . *H04N 21/47202* (2013.01); *H04N 21/47208* (2013.01); *H04N 21/47217* (2013.01); *H04N 21/812* (2013.01); *H04N 21/4334* (2013.01)

(56) References Cited

U.S. PATENT DOCUMENTS

| | | | |
|---|---|---|---|
| 2003/0121055 A1* | 6/2003 | Kaminski | H04N 21/4335 348/E7.071 |
| 2004/0078829 A1* | 4/2004 | Patel | H04N 21/4335 348/E7.071 |
| 2004/0128317 A1* | 7/2004 | Sull | G06F 16/743 |
| 2006/0059533 A1* | 3/2006 | Aerts | G11B 27/105 725/135 |
| 2006/0080716 A1 | 4/2006 | Nishikawa et al. | |

* cited by examiner

SYSTEMS AND METHODS FOR ENHANCED TRICK-PLAY FUNCTIONS

CROSS-REFERENCE TO RELATED APPLICATIONS

This application is a continuation of U.S. patent application Ser. No. 15/999,696, filed Aug. 20, 2018, which is a continuation of U.S. patent application Ser. No. 15/049,849, filed Feb. 22, 2016, now U.S. Pat. No. 10,057,655, which is a continuation of U.S. patent application Ser. No. 14/470,877, filed Aug. 27, 2014, now U.S. Pat. No. 9,271,042, which is a continuation of U.S. patent application Ser. No. 13/102,763, filed on May 6, 2011, now U.S. Pat. No. 9,088,827, which is a continuation of U.S. patent application Ser. No. 11/365,787, filed on Feb. 28, 2006, now U.S. Pat. No. 7,962,942, each of which is hereby incorporated herein by reference in its entirety.

BACKGROUND OF THE INVENTION

This invention is directed to systems and methods for trick-play functions in video or audio entertainment systems.

Interactive media guidance applications, such as interactive television program guides, are well known in the art. Some interactive media guidance applications provide video entertainment device users with the ability to perform "trick-play" functions upon video. Such trick-play functions include pause, rewind, and fast-forward. The interactive media guidance applications cache video programs that are transmitted over a network or transmission system (e.g., satellite, cable, or off-the-air) to allow users to trick-play through the video programs. To provide trick-play functions, these systems may begin caching video when the user tunes to the program, which may be in progress. As a result, users of such systems can rewind to the point in time when they first tuned to the program, but not to any prior point in time.

Accordingly, it would be desirable to provide systems and methods for trick-play functions by which the user may rewind a video to a time prior to when the user first started viewing the video and fast-forward to a point beyond where the real-time transmission is presently streaming.

SUMMARY OF THE INVENTION

In accordance with the principles of the present invention, systems and methods are provided for supporting trick-play functions in video entertainment systems. For purposes of clarity, and not by way of limitation, the present invention may sometimes be described herein in the context of providing rewind, pause, and fast-forward functions for videos, such as television programs, but may be applied to any other suitable non-on-demand media (e.g., audio).

In various embodiments of the present invention, videos are distributed to the equipment of a user (or group of users) in a non-on-demand fashion in digital or analog real-time streams. For example, in television systems, the videos may be delivered via broadcast, cable, or satellite, and are provided according to a schedule. A server, remote from the user, caches or records the videos before or during their distribution.

A client application, sometimes referred to herein as a "trick-play client," is implemented on the user's equipment. When a user starts watching a stream, the client begins to cache the video that is being watched so that the user may rewind through the buffer to the point at which the user started watching the stream. Concurrently or after the user accesses a video that began before the user accessed it (e.g., automatically or in response to a user request), the client receives from the server a rewind stream generated by the server from the server-cached or server-recorded copy of the video. The rewind stream streams the full-scale video (e.g., without skipping any frames) backwards from the point at which the user first accessed the video. The client locally caches the rewind stream so that the user may rewind the program anytime after the rewind stream is received to a point in the video that corresponds to content that was transmitted before the user had first accessed the video.

In some embodiments, the client also caches the video as it is received. This allows the user to rewind and watch the program from a point before the user first accessed the video, and continue watching (or fast-forward) the video as the user desires to a point beyond that when the user first accessed the video.

In some embodiments, the client receives from the server a forward stream generated by the server from the cached or recorded copy of the video. The forward stream streams the full-scale video (e.g., without skipping any frames) forward from the point at which the user first accessed the video at a speed that is faster than real-time. The client locally caches the forward stream so that the user may fast-forward the program as soon as the forward stream is received to a point that is ahead of the real-time stream of the video. The real-time stream of the video may be provided by, for example, a primary real-time video feed (e.g., broadcast feed).

In some embodiments, the client receives the rewind and/or forward streams automatically. In other embodiments, the client requests the rewind and/or forward streams upon, for example, the user accessing the video, or after determining that the user has interest in the video such that caching the rewind and/or forward stream is warranted.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
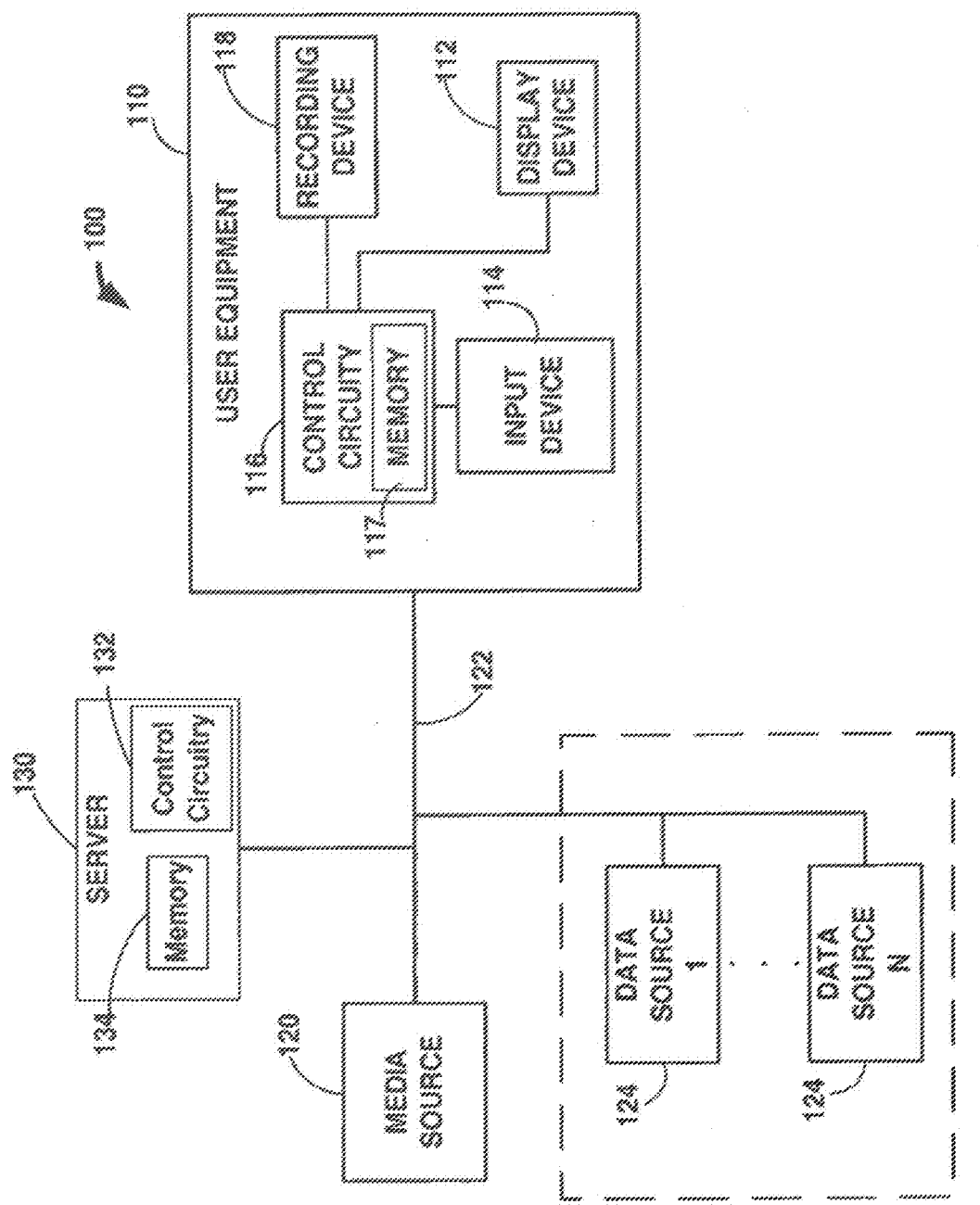
FIG. 1 is a diagram of an illustrative interactive media system in accordance with one embodiment of the present invention.

FIG. 1 shows illustrative interactive media system 100 in accordance with one embodiment of the invention. User equipment 110 receives media in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system headend, satellite media distribution facility, media broadcast facility, internet protocol television (IPTV) headend, on-demand server (e.g., VOD server), website, game service provider (e.g., for online gaming), or any other suitable facility or system for originating or distributing media. Media source 120 may be configured to transmit signals over any suitable communications path 122 including, for example, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing the instructions of a trick-play client or an interactive media guidance application such as, for example an online interactive media guidance application.

User equipment 110 may include any equipment suitable for providing an interactive media experience. User equipment 110 may include television equipment such as a television, set-top box, recording device, video player, user input device (e.g., remote control, keyboard, mouse, touch pad, touch screen or voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a fixed electronic device such as, for example, a gaming system (e.g., X-Box, PlayStation, or GameCube) or a portable electronic device, such as a portable DVD player, a portable gaming device, a cellular telephone, a PDA, a music player (e.g., MP3 player), or any other suitable fixed or portable device.

In the example of FIG. 1, user equipment 110 includes at least control circuitry 116, display device 112, user input device 114, and recording device 118 which may be implemented as separate devices or as a single device. A trick-play client may be implemented on user equipment 110 to provide trick-play functions to the user for media displayed on display device 112. In some embodiments, the trick-play client is part of an interactive media guidance application, such as an interactive television program guide. For purposes of clarity, and not by way of limitation, the following embodiments will be described as provided by a trick-play client.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the trick-play client. Display device 112 may also be configured to provide for the output of audio.

Recording device 118 may be a personal video recorder (PVR), digital video recorder (DVR), video cassette recorder (VCR), DVD-recorder, or any other suitable video recorder. Recording device 118 may include one or more tuners. The trick-play client directs recording device 118 to cache the rewind and forward streams from server 130.

Control circuitry 116 is adapted to receive user inputs from input device 114 and execute the instructions of the trick-play client. Control circuitry 116 may include one or more tuners (e.g., analog or digital tuners), encoders and decoders (e.g., MPEG decoders), processors (e.g., Motorola 68000 family processors), memory 117 (i.e., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 116 may be included as part of one of the devices of user equipment 110 such as, for example, part of display 112 or any other device (e.g., a set-top box, television and video player).

In some embodiments, the trick-play client may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data sources 124. But for the clarity of the figure, the equipment of only a single user is shown. The equipment of the plurality of users may be connected to media source 120 and data source 124 using a cable television network, a satellite television network, a local area network (LAN), a wireless network, the Internet, or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive television program guide. Another data source 124 may, for example, provide data for another interactive application (e.g., a home shopping application). In some embodiments, data sources 124 may provide data to the trick-play client using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

Illustrative interactive television system 100 includes server 130. Server 130 includes control circuitry 132 and memory 134 for executing, for example, operations requested by media source 120 or user equipment 110 (e.g., providing a cached video to the trick-play client). Control circuitry 132 may include one or more tuners, processors, encoders/decoders, communications circuitry, and I/O circuitry connected to the various devices of interactive television system 100, or any other suitable component. Control circuitry 132 may access video or other media provided by media source 120 in any suitable manner, for example by directing a tuner to tune to the channel transmitted by media source 120. As another example, server 130 may access the video directly, for example via an internet protocol connection (e.g., file transfer protocol or DOCSIS QAM stream) to media source 120.

Server 130 may be incorporated in media source 120 (e.g., at the head-end of a cable plant), data source 124, a VOD server (not shown), user equipment 110 (e.g., as a second recording device, or a hard drive on a home computer), an Internet server, or any other suitable device. Alternatively, server 130 may be a stand alone device (e.g., a commercial network recording device, or a DVR device in a home or neighborhood network). In some embodiments, all media provided by media source 120 may first be transmitted to server 130, which may subsequently transmit the media to user equipment 110. In such embodiments, the server may record (in systems where user-initiated server-based recording is provided) or cache the media as it is received, and subsequently or simultaneously transmit the media to the user's equipment. In other embodiments, the media source may simultaneously provide media both to the server and to the user's equipment. In such embodiments, the server may only provide rewind and/or forward streams of the media that is has recorded or cached to the user's equipment in response to a request by the trick-play client. In some embodiments, the server may cache or record videos before they are provided to users by media source 120.

Server 130 may receive instructions from user equipment 110 or media source 120 (or any other device of interactive media system 100) to perform suitable operations. Such operations may include, for example, recording or caching some or all of the videos that are transmitted by media source 120. In some embodiments, server 130 may cache every video that is transmitted by media source 120. In some embodiments, server 130 may only cache particular videos (e.g., particular broadcast programs) or particular channels (e.g., user favorite channels). The user's equipment or the media source may identify a particular video in any suitable manner (e.g., from the channel map and the program map table of a QAM stream, or a program identifier), and communicate a request to control circuitry 132 to record or cache the video in memory 134. In some embodiments, users may record videos on server 130. In such embodiments, server 130 may use the recorded video (which may have been recorded for users other than the one using the enhanced rewind functionality) as "cached" video for the rewind and/or forward stream.

The trick-play client, the media source, or the server may select, based on any suitable criteria, the videos that the server records or caches and for which the enhanced rewind and fast-forward functionality of the present invention is available. Such criteria may include, for example, a user's viewing history, the programs or channels that a user typically watches, records, or sets reminders for, user interests as identified by a user profile (e.g., a profile established by asking the user a series of questions). In some embodiments, the criteria may include identifying the programs that the user watches while another program is recorded, the two or more simultaneously transmitted programs among which the user switches, or the programs that the user starts watching after the beginning of the program. If the server has limited memory capabilities, or if the user is allotted a small amount of server memory, the trick-play client may be more discriminating in the selection of videos that the server records or caches for the user.

Other criteria for selecting the videos for which the enhanced rewind and fast-forward functionality is available may include the viewing histories or user profiles of some or all of the users of the interactive media system, the popular programs of some or all of the users, or any other criteria derived from more than one user or from a family of users of the interactive media system. As another example, only videos provided by preferred media providers (e.g., providers who pay a fee) may be recorded or cached on the server. Such videos may be identified to users as "provided with enhanced trick play," for example, letting users know that they may rewind, potentially to the beginning of the video even if they joined the video after the video began. In some embodiments, a channel may be identified as "provided with enhanced trick play." The rewind buffer length may be sufficient to allow the user (after some time) to rewind to a point prior to the beginning of the program (e.g., two or three hours, or to yesterday's videos).

Recorded and cached videos are stored by server 130 in memory 134. Memory 134 may be any suitable memory for recording or caching video such as, for example, one or more hard-drive arrays, hard discs, server arrays, RAM, SRAM, DRAM, ROM, flash memory, or any other suitable memory. In some embodiments, memory 134 may store instructions from control circuitry 132, user equipment 110, media source 120, or any other device of interactive media system 100 related to recorded or cached video. Such instructions may include, for example, how long to keep the video in memory, which users have access to the video (e.g., in a tier-based system), or any other suitable instruction. In the example of FIG. 1, memory 134 is shown as a component of server 130, but in other embodiments, memory 134 may be a stand-alone component.

When a user of user equipment 110 accesses a non-on-demand video (such as, for example, by tuning to a channel), the trick-play client may automatically direct recording device 118 of user equipment 110 to cache the video in one or more buffers. In addition, the trick-play client may send a request to server 130 for a rewind stream that includes the portions of the video that were transmitted before the user first started viewing the video.

In some embodiments, the trick-play client may also send a request to server 130 for a forward stream that includes the portions of the video that the trick-play client has not yet cached. The trick-play client may first determine whether the entire video is cached or recorded by server 130 before requesting a forward stream. Alternatively, the trick-play client may systematically request the forward stream and wait for a response from server 130 regarding whether the forward stream portions of the video are available.

The trick-play client may request the rewind and/or forward streams at any suitable time including, for example, as soon as the user starts viewing a video (e.g., tunes to a channel), after a given amount of time (e.g., 1 minute or 5 minutes), in response to a trick-play request from the user (e.g., pause or rewind), or at any other suitable time.

In response to receiving the requests for the rewind and/or forward streams, server 130 may generate and transmit rewind and/or forward streams to user equipment 110, if they are available. For example, if the trick-play client requests both rewind and forward streams for a sporting event that is broadcast live, server 130 may generate and transmit only the rewind stream because the server has not cached or recorded the entire sporting event. The forward stream, if provided to user equipment 110, may include the full feature video (e.g., without skipping any frames) and may be transmitted at a speed that is faster than the real-time video is transmitted, (e.g., 2× faster). The forward stream therefore may require more bandwidth than the real-time video. Similarly, the rewind stream may include the full feature video (e.g., without skipping any frames) and may be transmitted at a speed that is faster than real-time.

Server 130 may provide the rewind and forward streams to user equipment 110 using any suitable transmission scheme (e.g., MPEG-2 QAM stream or DOCSIS QAM stream). For example, the rewind and forward streams may each be added as separate programs in the live QAM stream used to transmit the video (e.g., the rewind stream is placed in a first PID (packet identifier), and the forward stream is placed in a second PID, where the PIDs are in the QAM stream). As another example, the rewind and forward streams may both be added as a single program in the live QAM stream (e.g., a single PMT (program map table) PID may identify both the rewind video and audio, and the forward video and audio as well as the primary real-time video and audio). As still another example, the server may generate one or more new QAM streams each containing one of the rewind and forward streams.

The video of the rewind stream may be provided in any suitable manner such as, for example, reverse order bitwise (e.g., as if the user is rewinding from the moment the buffers were created), reverse order by block, reverse order by packet, or by randomly filling in bits of data that are missing (e.g., a bit torrent approach). For approaches other than the reverse order bitwise, the rewind functionality is only available once the video cached by the trick-play client is sufficiently continuous to support playback.

Figure 2:
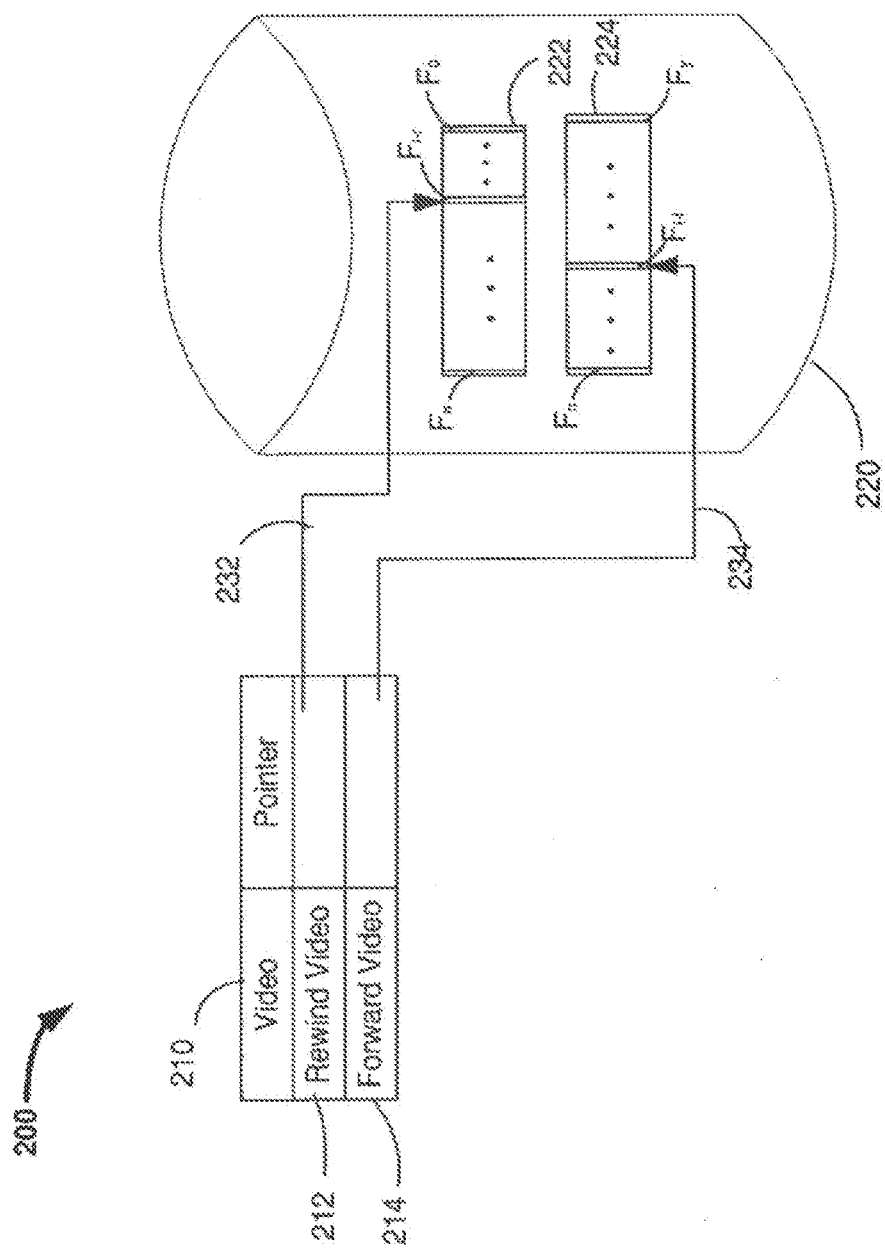
FIG. 2 shows an illustrative data structure for buffers in accordance with one embodiment of the present invention.

The trick-play client may direct recording device 118 to cache the rewind and/or forward streams provided by server 130 in one or more buffers. FIG. 2 shows an illustrative data structure for the one or more buffers. Data structure 200 includes table 210 and buffers 222 and 224. Table 210 may be stored in recording device 118 (e.g., in memory 220), in memory of control circuitry 116 (e.g., RAM), or in any other memory of user equipment 110. Buffers 222 and 224 may be stored in memory 220 of recording device 118 (e.g., on a hard drive). Table 210 includes a column for streams of the video (e.g., rewind and forward streams) and a column for pointers linking the streams to their respective buffers. In response to receiving the rewind/and or forward streams from server 130, the trick-play client creates rows 212 and 214 for the streams in table 210.

The video provided by the rewind stream is cached in rewind buffer 222. The current frame cached in the rewind buffer, $F_{i-r}$, is identified by pointer 232. Rewind buffer 222 begins with frame $F_n$, the frame that was displayed when the user started viewing the video, and ends with frame $F_0$, which is the first frame of the video. The rewind buffer is filled backwards substantially continuously from frame $F_n$ to frame $F_0$ (e.g., in reverse order bitwise) with the video of the rewind stream. Similarly, the video provided by the forward stream is cached in forward buffer 224. The current frame in the forward buffer, $F_{i-f}$, is identified by pointer 234. Forward buffer 224 begins with frame $F_n$ and ends with frame $F_y$, which is the last frame of the video. The trick-play client may preferably cache video in forward buffer 224 at a speed that is faster than real time. If the trick-play client does not receive a forward stream, the trick-play client may instead cache the real-time stream of the video in forward buffer 224.

Figure 3:
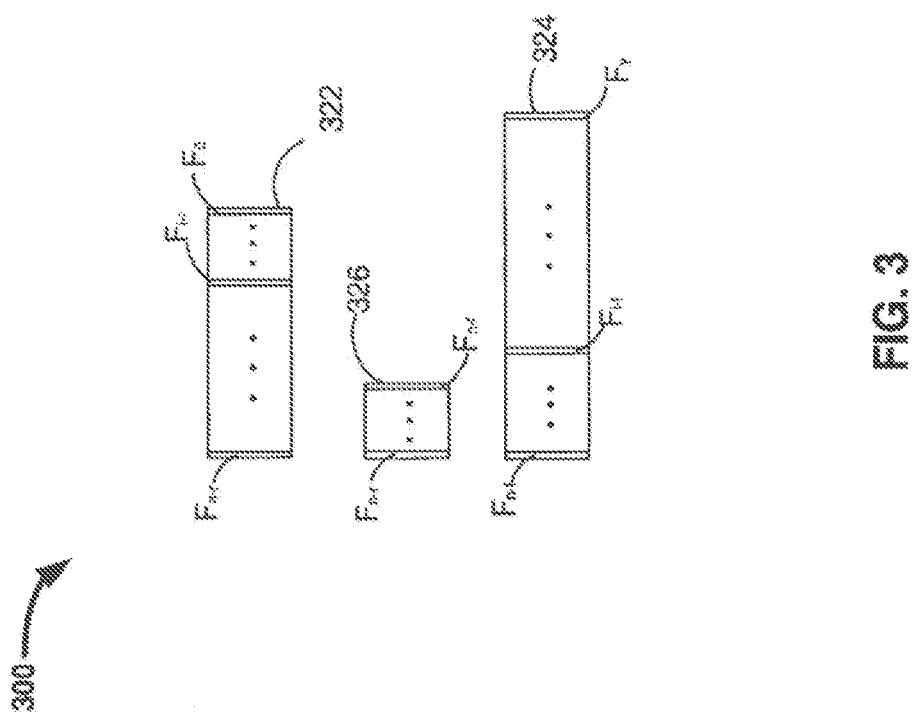
FIG. 3 shows another illustrative data structure for buffers in accordance with one embodiment of the present invention.

In some embodiments, the trick-play client does not request or receive rewind and/or forward streams until after the user has viewed the video for a given time. If recording device 118 cached the real-time stream during the given time (e.g., in a real-time buffer), the trick-play client may request that the rewind stream begin when the user started viewing the video and that the forward stream begin after the given time. Then, as shown in FIG. 3, rewind buffer 322 begins with frame $F_{n-r}$ (e.g., the frame at which the user started to view the video), forward buffer 324 begins with frame $F_{n-f}$ (e.g., the frame of the video after the given time), and real-time buffer 326 includes the video between frames $F_{n-r}$ and $F_{n-f}$. Once recording device 118 begins to cache the forward stream, the trick-play client may direct recording device 118 to stop caching the real-time stream to avoid caching the same video twice. Alternatively, the trick-play client may delete the video cached in the real-time buffer and direct server 130 to provide reverse and forward streams that begin at the same frame, for example any frame between frames $F_{n-r}$ and $F_{n-f}$.

When the user calls a trick-play function, the trick-play client may seamlessly migrate the video from the real-time video stream to the video cached in the rewind buffer and the real-time and/or forward buffer. The user's trick-play functionality is then provided by the buffers stored locally in the recording device, and not remotely, from the server. To play back the video cached in the rewind buffer, the trick-play client may direct recording device 118 to provide the video cached in rewind buffer 222 from frame $F_0$ to frame $F_n$. To play back the video cached in the forward buffer, the trick-play client may direct recording device 118 to provide the video cached in forward buffer 224 from frame $F_n$ to frame $F_y$. The trick-play client may identify which buffers to play back using table 210 (e.g., connecting the buffers like a linked list).

Figure 4:
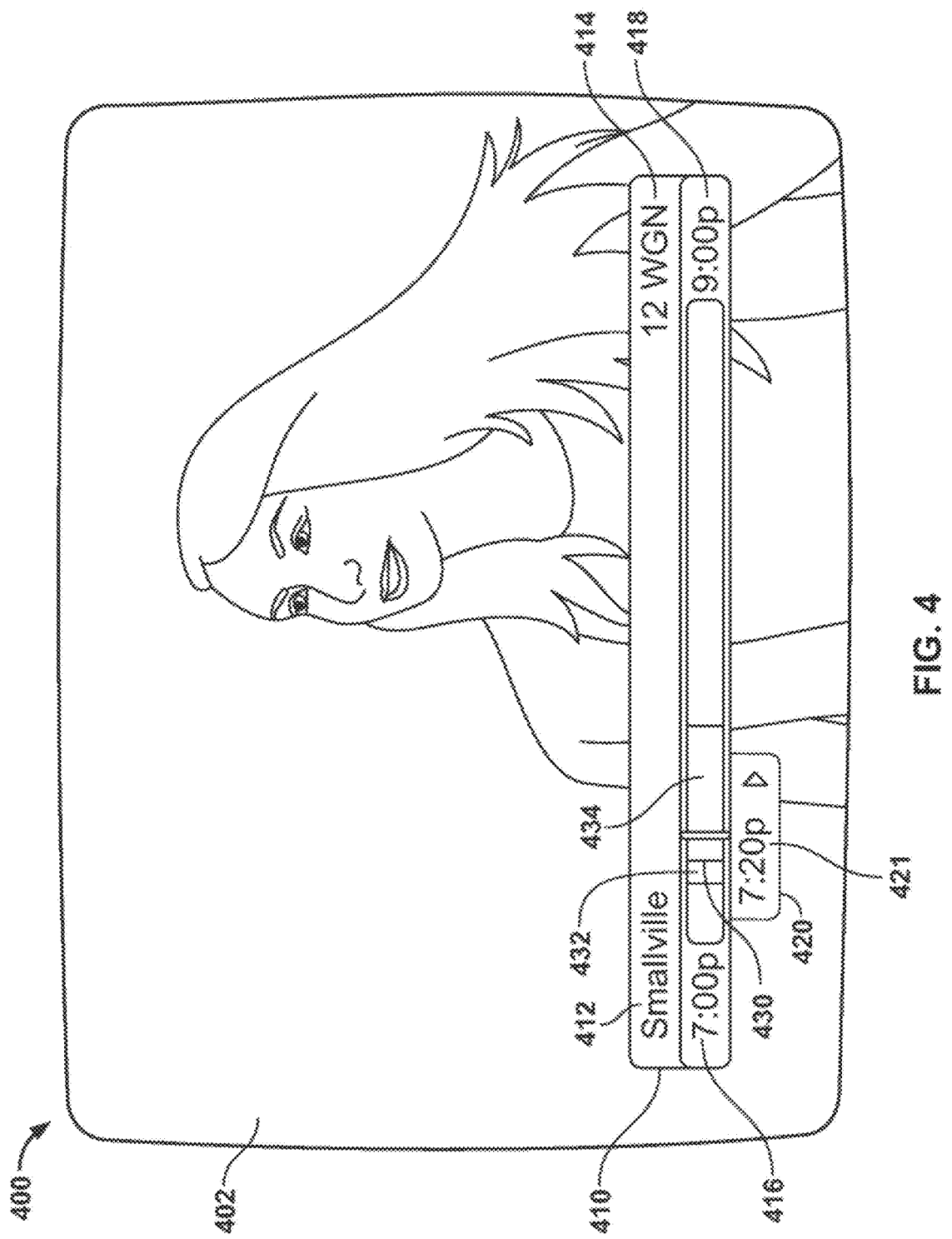
FIG. 4 shows an illustrative display having a transport control bar in accordance with one embodiment of the present invention.

The trick-play client may display a visual representation of the rewind and forward buffers using an enhanced transport control bar. FIG. 4 shows illustrative screen 400 of the video 402 that the user is viewing, and enhanced transport control bar 410. Enhanced transport control bar 410 includes title 412 of video 402, channel 414 on which the video is transmitted, as well as start time 416 and end time 418 of the video. Enhanced transport control bar 410 includes cursor 420 that indicates the current playback location and time 421 of video 402 for the user.

Enhanced transport control bar 410 includes mark 430 identifying when the user first started viewing the video. Enhanced transport control bar 410 also includes visual representations of the rewind and forward buffers into which the rewind and forward streams are cached, respectively. In particular, rewind buffer representation 432 begins at mark 430 and moves backwards in time towards the beginning of the video, and forward buffer representation 434 begins at mark 430 and moves forward in time towards the end of the video. For videos that server 130 has not recorded or cached in their entirety, and for which forward streams are not available, forward buffer representation 434 may represent the real-time buffer that is cached with the video from the real-time stream.

Figure 5:
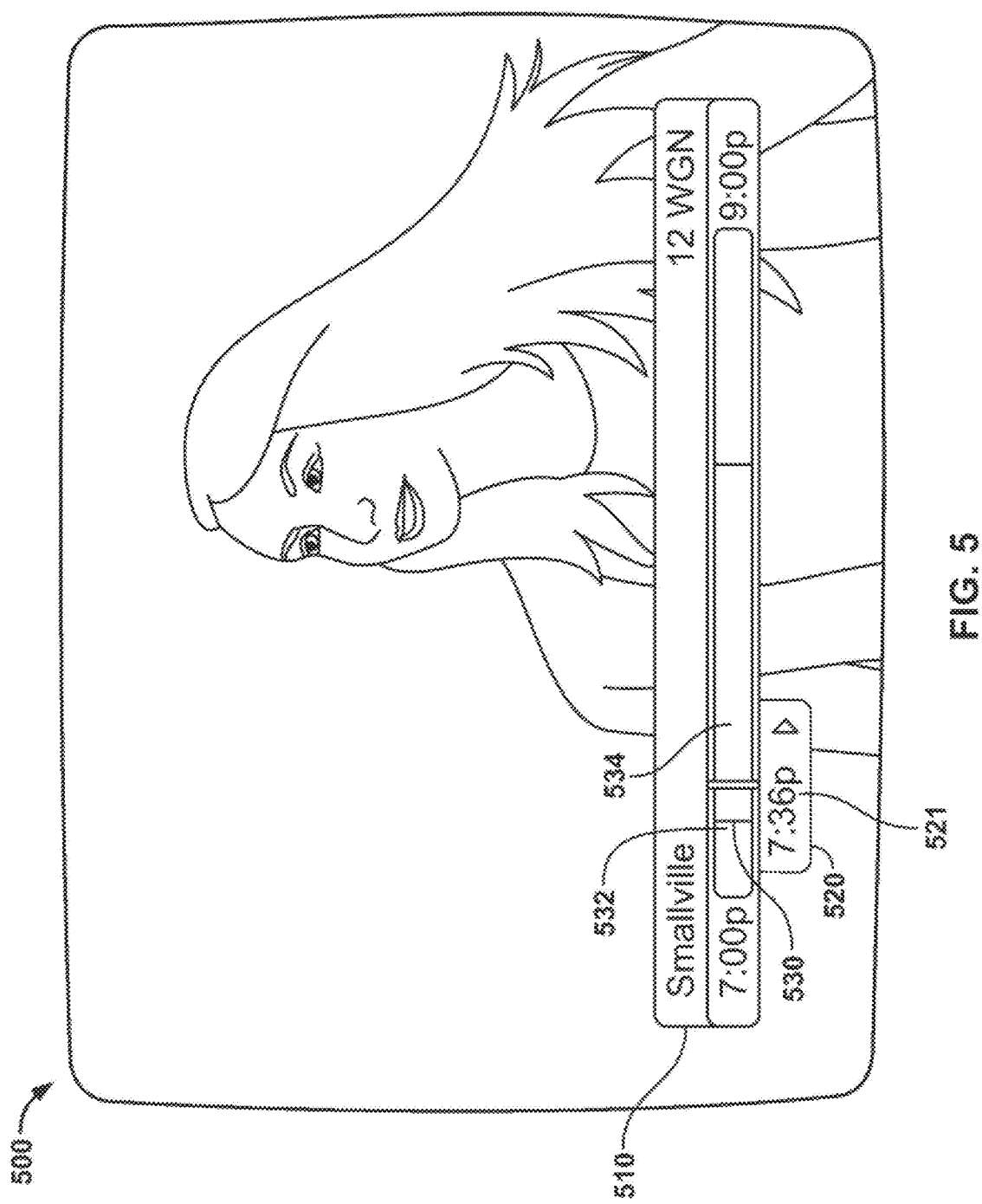
FIG. 5 shows another illustrative display having a transport control bar in accordance with one embodiment of the present invention.

FIG. 5 represents the enhanced transport control bar of FIG. 4 after the trick-play client has cached additional portions of the rewind stream and the forward stream in recording device 118 (this can be seen by comparing FIGS. 4 and 5). In enhanced transport control bar 510, cursor 520 has advanced and indicates that the current playback time is 7:36, 16 minutes later than the playback time indicated in enhanced transport control bar 410 of FIG. 4. Mark 530 has not moved from FIG. 4, but rewind buffer 532 has advanced all the way to the beginning of the video, and forward buffer 534 has advanced towards the end of the video.

Figure 6:
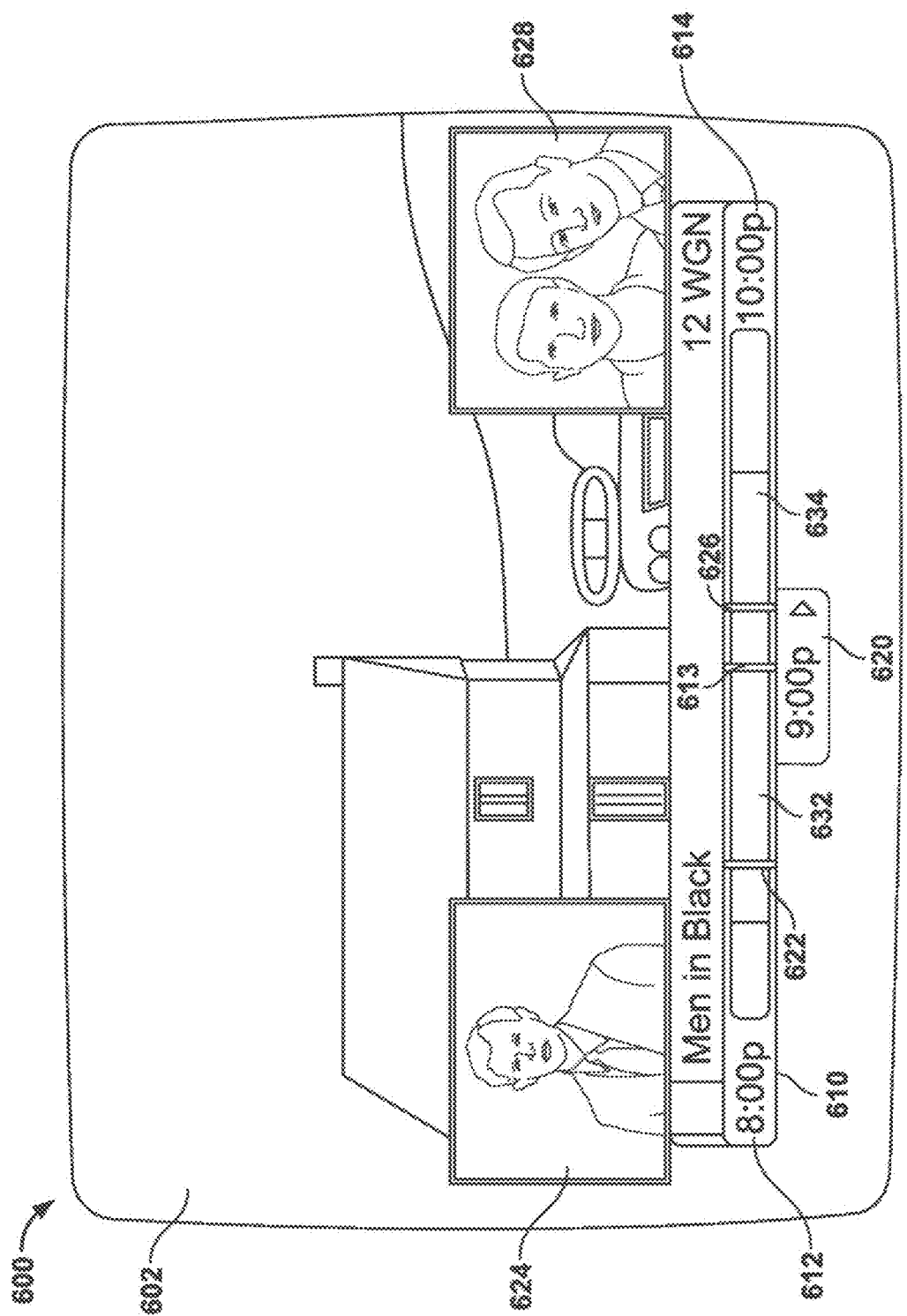
FIG. 6 shows still another illustrative display having transport control bar in accordance with one embodiment of the present invention.

FIG. 6 shows another illustrative display of a visual representation of the rewind and forward buffers in an enhanced transport control bar. Screen 600 includes video 602 that the user is viewing, and enhanced transport control bar 610. Enhanced transport control bar 610 includes start time 612 and end time 614 of the video, cursor 620 that indicates the current playback location for the user, and representations of rewind buffer 632 and forward buffer 634. Enhanced transport control bar 610 also includes rewind cursor 622 and forward cursor 626, which are associated with rewind preview image 624 and forward preview image 628, respectively. In particular, rewind preview image 624 may correspond to the position of rewind cursor 622, and forward preview image 628 may correspond to the position of forward cursor 626. In some embodiments, the user may direct the trick-play client to display multiple rewind and forward cursors and associated preview images.

In some embodiments, the rewind and forward cursors may correspond to the frames of the rewind and forward streams that the trick-play client is currently caching. Alternatively, the rewind and forward cursors may correspond to trick-play requests of the user (e.g., rewinding or fast-forwarding in preview images 624 or 628). The trick-play client may automatically display one or both of preview images 624 and 628, or the user may request the preview images be displayed. When the user has identified a portion of the video in preview image 624 or 628 that the user would like to play back, the user may display the preview image in full screen and play back the video at the playback position of the selected preview image.

The buffers for caching the video may be arbitrarily limited in size, or limited only by the space available on recording device 118. If the buffers are limited in size or recording device 118 has limited space available, the buffer may not be large enough to cache an entire video. To provide enhanced trick-play functions to the user, the trick-play client may cache the rewind and/or forward streams in buffers, and overwrite the rewind and/or forward buffers as necessary to comply with a user trick-play request (e.g., in response to a rewind request that extends to video not cached in the rewind buffer, request a new rewind stream that is cached in place of the forward buffer). The trick-play client may, instead or in addition, identify advertisements in the rewind and forward streams (e.g., from packet identifiers) and not cache the advertisements.

Once the entire video is cached in buffers, the client may, automatically or in response to a user instruction, save the cached video as a recording for future viewing. In some embodiments, the client may, automatically or in response to a user instruction, save an incomplete video that is cached in the buffers.

In some embodiments, server 130 may not cache or record every video that is provided to user equipment 110. The trick-play client may then, before requesting a rewind and/or forward stream, determine whether server 130 has cached or recorded the video. For example, the trick-play client may receive an indication from server 130 whether the video is available. In response to determining that the video is in fact available, the trick-play client may request the rewind and/or forward streams from server 130.

The trick-play client may determine whether server 130 has cached or recorded a partially or in its entirety video at any suitable time. For example, server 130 may identify for the trick-play client the videos that the server has or will cache or record for a given time period (e.g., the next day or week) at regular intervals. Server 130 may further specify to the trick-play client the time at which the videos will be cached or recorded in their entirety. The trick-play client may in turn identify the videos for the user. For example, the trick-play client may display an icon, shade the listing, change a color, or provide any other suitable indication on the transport control bar or in a program grid.

Figure 7:
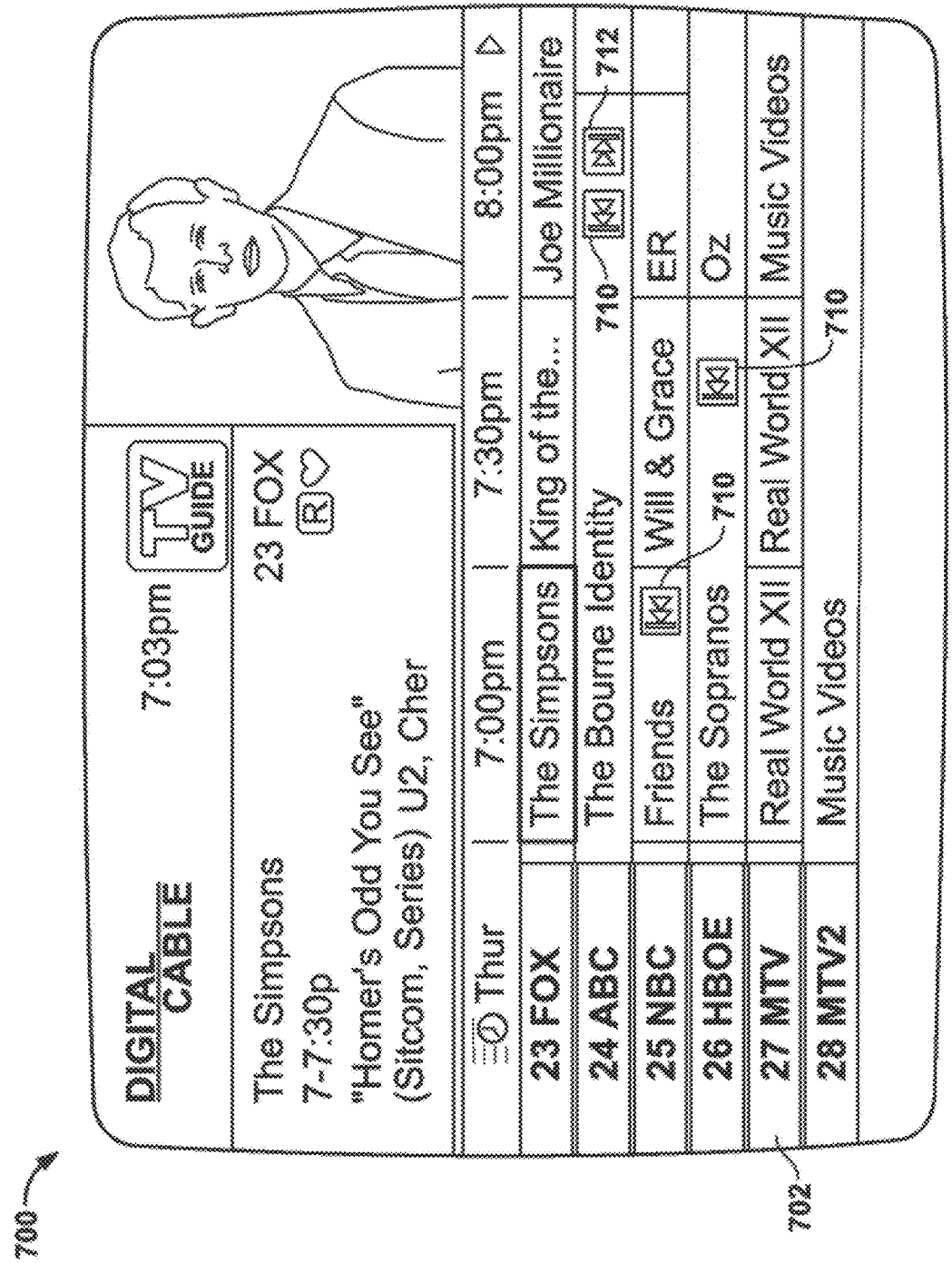
FIG. 7 shows an illustrative display screen having a program grid in accordance with one embodiment of the present invention.

FIG. 7 shows illustrative program grid screen 700 that includes grid 702 of program listings. The programs listed in grid 702 that have been cached or recorded by server 130 are identified by icons 710 and 712. Rewind icon 710 indicates that server 130 has at least partially cached or recorded the program associated with the icon, and that a rewind stream is available (e.g., "Friends" and "The Sopranos"). Forward icon 712 indicates that server 130 has cached or recorded the program associated with the icon in its entirety, and that a forward stream is available (e.g., "The Bourne Identity"). The trick-play client may display both rewind icon 710 and forward icon 712 to indicate that both rewind and forward streams are available. Alternatively, the trick-play client may display only forward icon 712 to indicate that rewind and forward streams are available (e.g., because if an entire video is cached or recorded, the server may provide a rewind stream). Though FIG. 7 shows icons, the program grid may include any other suitable indication. The trick-play client may use one or more indicators to identify videos for which a user may request rewind or fast-forward streams.

Figure 8:
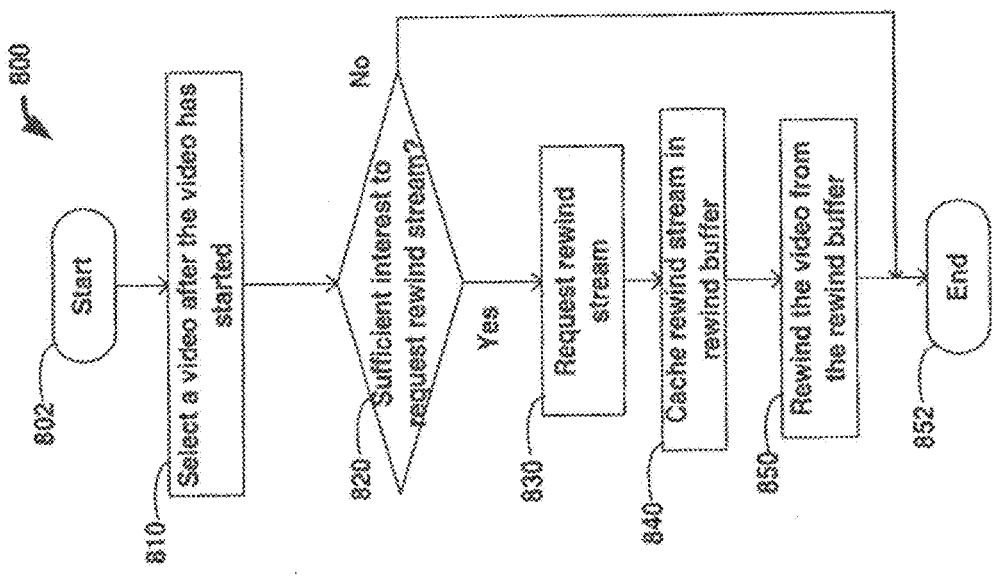
FIG. 8 shows a flow chart of an illustrative process for rewinding a video in accordance with one embodiment of the present invention.

The following flow charts serve to illustrate processes involved in some embodiments of this invention. FIG. 8 is a flow chart of an illustrative process for rewinding a video to a point prior to when the user first started viewing the video. Process 800 begins at step 802. At step 810, the user selects a non-on-demand video after the video has already started (e.g., starts viewing a broadcast program after the broadcast has started). For example, the user may direct a tuner in control circuitry 116 to tune to a real-time stream provided by media source 120 by entering a channel number or by selecting a program from a suitable trick-play client display (e.g., a program guide grid).

At step 820, the trick-play client determines whether the user has a sufficient interest in the video to warrant requesting a rewind stream. For example, the trick-play client may determine whether the user has viewed the video for a given amount of time, or whether the user has called a trick-play function (e.g., "rewind"). In some embodiments, prior to step 820, the trick-play client may determine whether server 130 has cached or recorded the selected video. In the process shown in FIG. 8, however, this step has been omitted. If the trick-play client determines that the user does not have a sufficient interest in the video to warrant requesting a rewind stream, process 800 moves to step 852 and ends.

If instead, at step 820, the trick-play client determines that the user has a sufficient interest in the video to warrant requesting a rewind stream, process 800 moves to step 830. At step 830, the trick-play client requests a rewind stream from server 130. The rewind stream includes the video that was transmitted by media source 120 prior to the time when the user first selected the video. The video of the rewind stream may begin at the time when the user first selected the video, and stream backwards in time to the beginning of the video. The rewind stream may provide the video content in any suitable manner such as, for example, reverse-order bitwise.

At step 840, the trick-play client receives the rewind stream from server 130 over communications path 122 and directs recording device 118 to cache the rewind stream in one or more rewind buffers. At step 850, the trick-play client rewinds the video to a point prior to when the user first selected the video by rewinding the video through the one or more rewind buffers. The trick-play client may then play back the video from the one or more rewind buffers. Process 800 ends at step 852.

Figure 9:
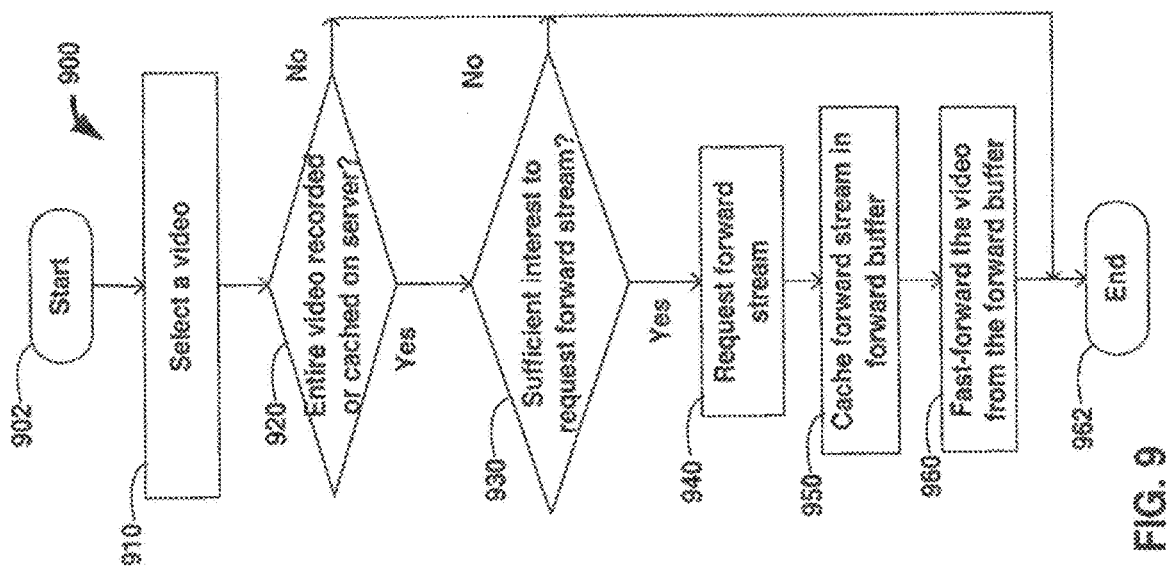
FIG. 9 shows a flow chart of an illustrative process for fast-forwarding a video in accordance with one embodiment of the present invention.

FIG. 9 is a flow chart of an illustrative process for fast-forwarding a video to a point that has not yet been reached by the real-time stream of the video. Process 900 begins at step 902. At step 910, the user selects a non-on-demand video transmitted in a real-time stream (e.g., a broadcast program). For example, the user may direct a tuner in control circuitry 116 to tune to a real-time stream provided by media source 120 by entering a channel number or selecting a program from a suitable trick-play client display (e.g., a program guide grid).

At step 920, the trick-play client determines whether server 130 has recorded or cached the entire video. For example, the trick-play client may request an indication from server 130 of the videos that have been recorded or cached in their entirety. As another example, the trick-play client may determine that server 130 recorded or cached a video if the video is a re-run or a repeated program (e.g., a repeat episode of a popular series). If the trick-play client determines that server 130 has not recorded or cached the video, process 900 moves to step 962 and ends.

If instead, at step 920, the trick-play client determines that server 130 has recorded or cached the video, process 900 moves to step 930. At step 930, the trick-play client determines whether the user has a sufficient interest in the video to warrant requesting a forward stream. For example, the trick-play client may determine whether the user has viewed the video for a given amount of time, or whether the user has called a trick-play function (e.g., "fast-forward"). If the trick-play client determines that the user does not have a sufficient interest in the video to warrant requesting a forward stream, process 900 moves to step 962 and ends.

If instead, at step 930, the trick-play client determines that the user has a sufficient interest in the video to warrant requesting a forward stream, process 900 moves to step 940. At step 940, the trick-play client requests a forward stream from server 130. The forward stream includes the entire video (e.g., without skipping any video frames) that was transmitted by media source 120 at least after the time when the user first selected the video (e.g., after the time at which the user requested the forward stream). In some embodiments, server 130 provides the forward stream to user equipment 110 at a speed that is greater than the speed of the real-time stream (e.g., at a speed greater than 1×).

At step 950, the trick-play client receives the forward stream from server 130 over communications path 122 and directs recording device 118 to cache the forward stream in one or more forward buffers. At step 960, the trick-play client fast-forwards the video through the forward buffer. The trick-play client may then play back the video from the one or more cached forward buffers. Process 900 ends at step 962.

Figure 10:
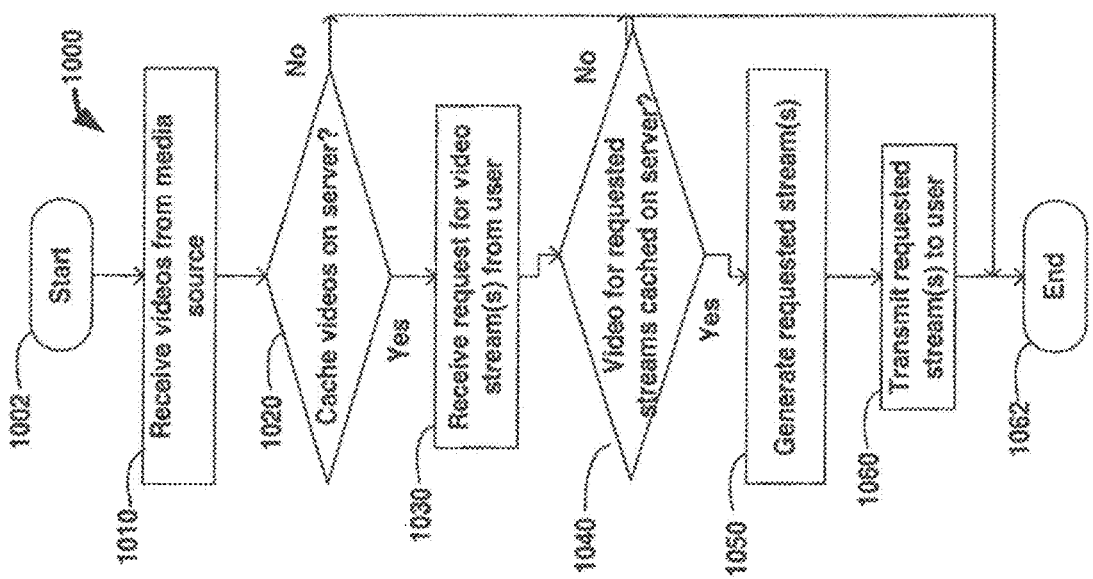
FIG. 10 shows a flow chart of an illustrative process for providing a video stream to a user's equipment in accordance with one embodiment of the present invention.

FIG. 10 is an illustrative flow chart for transmitting rewind and forward streams to user equipment 110. Process 1000 begins at step 1002. At step 1010, server 130 receives videos from media source 120, for example in a real-time stream that is also provided to the instances of user equipment 110 of interactive media system 100. At step 1020, server 130 determines whether to record or cache some or all of the videos received at step 1010. Server 130 may determine whether to record or cache a particular video using any suitable criteria (e.g., popular videos or preferred video providers). In some embodiments, media source 120, user equipment 110 or another device of interactive media system 100 may specify for server 130 which videos to cache or record.

If, at step 1020, the server determines that no videos are to be recorded or cached, process 1000 moves to step 1062 and ends. If instead, at step 1020, the server determines that at least one particular video is to be recorded or cached, process 1000 caches the at least one particular video and moves to step 1030. In some embodiments, process 1000 may skip step 1020 and simply record or cache every video.

At step 1030, server 130 receives a request from the trick-play client implemented on user equipment 110 for a video. The trick-play client may request a rewind stream of video that was transmitted before the user of the trick-play client started viewing the video. The trick-play client may also or instead request a forward stream of video that has not yet been transmitted by the real-time stream provided by the media source.

At step 1040, server 130 determines whether server 130 has recorded or cached the video required for the requested streams. For example, when a user requests a forward stream, the server may determine whether it has already recorded or cached the requested video in its entirety. If server 130 determines that it has not recorded or cached the video required for all of the requested streams, process 1000 moves to step 1062 and ends.

If instead, at step 1040, server 130 determines that it has recorded or cached at least some of the video required for the requested streams, process 1000 moves to step 1050. For example, server 130 may determine that it has cached the video needed for a rewind stream, but not the video required for a forward stream. At step 1050, server 130 generates at least one requested stream (e.g., a forward stream or a rewind stream) with the video required for the stream. At step 1060, server 130 transmits the at least one requested stream generated at step 1050 over communications path 122 to the trick-play client implemented on user equipment 110. Process 1000 ends at step 1062.

Figure 11:
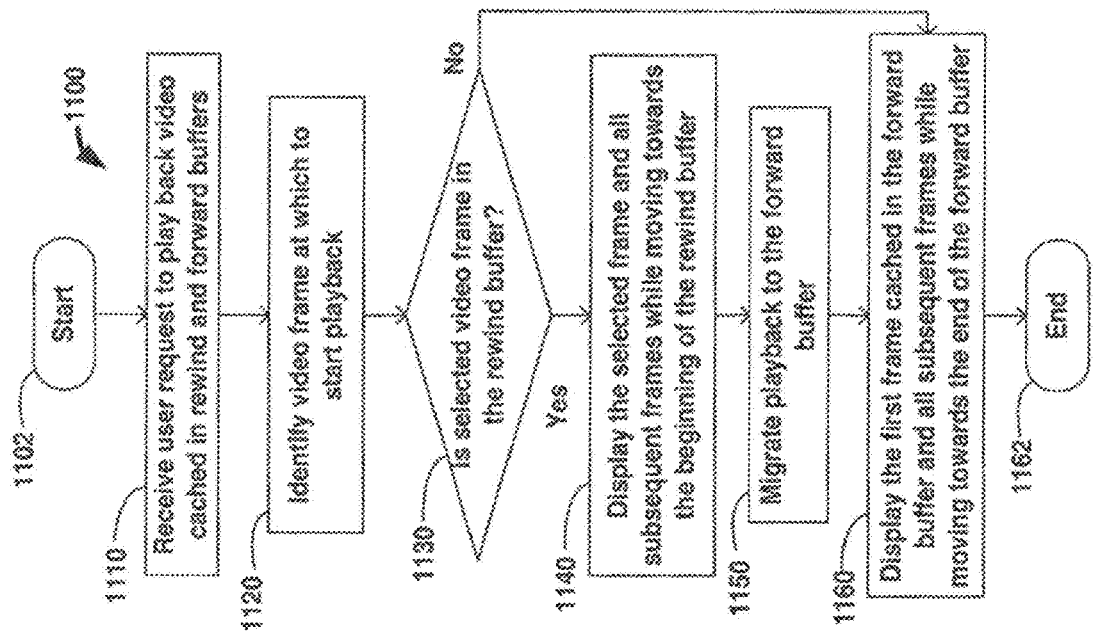
FIG. 11 shows a flow chart of an illustrative process for playing back video from rewind and/or forward buffers in accordance with one embodiment of the present invention.

FIG. 11 is an illustrative flow chart for playing back a video that has been cached in a rewind buffer and in a forward buffer with user equipment 110. Process 1100 begins at step 1102. At step 1110, the trick-play client receives a user request to play back at least a portion of a video cached in a rewind buffer and a forward buffer from the buffers. For example, the trick-play client may receive a user request to play back a video from the beginning.

At step 1120, the trick-play client identifies the video frame from which the user would like to start playing back the video. For example, if the user, while rewinding the video from the rewind buffer, selects a "play" key, the trick-play client may identify the video frame displayed at the time the user selected the "play" key.

At step 1130, the trick-play client determines whether the video frame identified at step 1120 is in the rewind buffer. If the trick-play client determines that the video frame is in the rewind buffer, process 1100 moves to step 1140. At step 1140, the trick-play client displays the identified frame on display device 112, and subsequently moves towards the beginning of the rewind buffer and displays the next frames cached in the rewind buffer. For example, if the rewind buffer begins at frame $F_n$, ends at frame $F_0$ (i.e., the beginning of the program), and the trick-play client identified frame $F_i$, the trick-play client displays frame $F_i$, then frame $F_{i+1}$, frame $F_{i+2}$, all the way to frame $F_n$. In other words, the trick-play client moves through the buffer with a first-in, last-out scheme.

At step 1150, the trick play client displays the last frame of the rewind buffer and migrates to the forward buffer. In some embodiments, the trick-play client may instead migrate to a real-time buffer (e.g., if there is no forward buffer, or if there is a real-time buffer between the rewind buffer and the forward buffer).

At step 1160, the trick play client displays the first frame of the forward buffer on display device 112, and subsequently moves towards the end of the forward buffer and displays the next frames cached in the forward buffer. For example, if the forward buffer begins at frame $F_n$, ends at frame $F_y$ (i.e., the end of the program), the trick-play client displays frame $F_n$, then frame $F_{n+1}$, frame $F_{n+2}$, all the way to frame $F_y$. In other words, the trick-play client moves through the buffer with a first-in, first-out scheme.

Process 1100 may also access step 1160 if, at step 1130, the trick-play client determines that the video frame is not in the rewind buffer (e.g., the identified frame is in the forward buffer). In that case, instead of the trick-play client first displaying the first frame of the forward buffer, the trick-play client first displays the frame identified at step 1120. Process 1100 then ends at step 1162.

The above described embodiments of the present invention are presented for purposes of illustration and not of limitation, and the present invention is limited only by the claims which follow.

What is claimed is:

1. A method comprising:
   determining, during playback of a real-time media stream at a playback device, that the real-time media stream has been played for a predetermined amount of time, wherein playback of the real-time media stream began at a first playback point that is after a start point of the real-time media stream; and
   in response to determining that the real-time media stream has been played for the predetermined amount of time, and while continuing to receive media data of the real-time media stream at the playback device:
      receiving, at the playback device, a rewind stream comprising media data of the real-time media stream from a second playback point that is before the first playback point to the first playback point, wherein the rewind stream comprises a plurality of frames received in reverse order;
      caching media data of the rewind stream in a rewind buffer local to the playback device;
      caching media data of the real-time media stream in a forward buffer local to the playback device and separate from the rewind buffer;
      generating for playback media data from the rewind buffer;
      at conclusion of playback of media data from the rewind buffer, generating for playback media data from the forward buffer; and
      at conclusion of playback of media data from the forward buffer, returning to playback of the real-time media stream.

2. The method of claim 1, wherein caching the rewind stream further comprises filling the rewind buffer with the rewind stream in reverse order bitwise manner.

3. The method of claim 1, wherein the second playback point is the start point of the real-time media stream.

4. The method of claim 1, wherein the second playback point is a playback point of the that is after the start point of the real-time media stream and before the first playback point.

5. The method of claim 1, wherein the real-time media stream is a non-on-demand media stream.

6. The method of claim 1, further comprising generating for display a control bar displaying a cursor corresponding to a current playback point of the real-time media stream.

7. The method of claim 6, wherein the control bar comprises a mark corresponding to the first playback point.

8. The method of claim 6, wherein the cursor is a movable cursor configured for movement to a playback point different from the current playback point.

9. The method of claim 8, further comprising generating for display a preview image, the preview image being an image of the real-time media stream at the playback point of the cursor.

10. A system comprising:
   a local storage device comprising:
      a rewind buffer; and
      a forward buffer separate from the rewind buffer; and
   control circuitry configured to:
      determine, during playback of a real-time media stream, that the real-time media stream has been played for a predetermined amount of time, wherein playback of the real-time media stream began at a first playback point that is after a start point of the real-time media stream; and
      in response to determining that the real-time media stream has been played for the predetermined amount of time, and while continuing to receive media data of the real-time media stream:
         receive a rewind stream comprising media data of the real-time media stream from a second playback point that is before the first playback point to the first playback point, wherein the rewind stream comprises a plurality of frames received in reverse order;
         cache media data of the rewind stream in the rewind buffer of the local storage device;
         cache media data of the real-time media stream in the forward buffer of the local storage device;
         generate for playback media data from the rewind buffer;
         at conclusion of playback of media data from the rewind buffer, generate for playback media data from the forward buffer; and
         at conclusion of playback of media data from the forward buffer, return to playback of the real-time media stream.

11. The system of claim 10, wherein the control circuitry configured to cache the rewind stream is further configured to fill the rewind buffer with the rewind stream in reverse order bitwise manner.

12. The system of claim 10, wherein the second playback point is the start point of the real-time media stream.

13. The system of claim 10, wherein the second playback point is a playback point of the that is after the start point of the real-time media stream and before the first playback point.

14. The system of claim 10, wherein the real-time media stream is a non-on-demand media stream.

15. The system of claim 10, wherein the control circuitry in further configured to generate for display a control bar displaying a cursor corresponding to a current playback point of the real-time media stream.

16. The system of claim 15, wherein the control bar comprises a mark corresponding to the first playback point.

17. The system of claim 15, wherein the cursor is a movable cursor configured for movement to a playback point different from the current playback point.

18. The system of claim 17, wherein the control circuitry is further configured to generate for display a preview image, the preview image being an image of the real-time media stream at the playback point of the cursor.

* * * * *